United States Patent [19]

Suzuki et al.

[11] Patent Number: 5,556,915
[45] Date of Patent: Sep. 17, 1996

[54] WATER-BASED ORGANOSILICON COMPOSITION

[75] Inventors: Takehiro Suzuki; Masashi Koide; Masahiro Fujii, all of Tokyo, Japan

[73] Assignee: Toyo Ink Manufacturing Co., Ltd., Tokyo, Japan

[21] Appl. No.: 332,495

[22] Filed: Oct. 31, 1994

Related U.S. Application Data

[63] Continuation of Ser. No. 991,408, Dec. 16, 1992, abandoned.

[30] Foreign Application Priority Data

Dec. 20, 1991 [JP] Japan ................................. 3-355125

[51] Int. Cl.$^6$ ............................ C08L 83/00; B01J 13/00; C04B 9/02
[52] U.S. Cl. ............... 524/837; 106/287.14; 106/287.13; 106/287.16; 106/14.11; 106/2; 252/312
[58] Field of Search ...................... 252/312; 106/287.14, 106/287.13, 287.16, 14.11, 2; 524/837

[56] References Cited

U.S. PATENT DOCUMENTS

| | | | |
|---|---|---|---|
| 4,504,621 | 5/1985 | Lefler, III .............................. | 524/783 |
| 4,578,727 | 5/1985 | Traver ................................. | 106/287.14 |
| 4,612,055 | 9/1986 | Manis et al. ......................... | 106/287.14 |
| 4,648,904 | 3/1987 | De Pasquale et al. ................ | 106/2 |
| 4,778,624 | 10/1988 | Ohashi et al. ....................... | 106/287.14 |
| 4,803,233 | 2/1989 | Narula et al. ........................ | 106/287.14 |
| 5,091,002 | 2/1992 | Schamberg et al. ................. | 106/287.14 |
| 5,108,782 | 4/1992 | Reed .................................... | 524/588 |
| 5,226,954 | 7/1993 | Suzuki ................................. | 106/287.14 |

*Primary Examiner*—John C. Bleutge
*Assistant Examiner*—Karen A. Dean
*Attorney, Agent, or Firm*—Wenderoth, Lind & Ponack

[57] ABSTRACT

An infiltration-type water-based organosilicon composition having excellent performance as a water absorption preventer for construction materials and being stable as an emulsion, which is prepared by emulsifying alkylalkoxysilane and/or its condensate in water in the presence of (a) an anionic emulsifier and/or nonionic emulsifier, (b) a thickener, and (c) an alkaline compound.

11 Claims, No Drawings

WATER-BASED ORGANOSILICON COMPOSITION

This application is a continuation of now abandoned application, Ser. No. 07/991,408, filed Dec. 16, 1992, abandoned.

FIELD OF THE INVENTION

The present invention relates to a water-based organosilicon composition useful as water-based barrier penetrant for concrete.

PRIOR ART

It has been widely known that alkylalkoxysilane and its condensate are useful as water repellents and barrier penetrants for construction materials such as concrete. The alkylalkoxysilane and its condensate are generally diluted with a variety of solvents for actual use. However, solutions of these water repellent materials in solvents have their own limits in use due to tile properties of the solvents such as toxicity, volatility, flammability, and the like. For example, when isopropyl alcohol which has relatively low toxicity is used as a solvent, it has too high an evaporation rate to infiltrate a substrate. On the other hand, when a relatively involatile solvent is used, a coated surface is difficult to dry and remains wet for a long period of time. Further, in general, solvent-based barrier penetrants cannot be coated on a wet concrete surface.

For using alkylalkoxysilane and its condensate as barrier penetrants for concrete, it is desirable to form aqueous solutions or water base dispersions of these. However, it has been considered that since alkylalkoxysilane is easily hydrolyzed and liable to undergo a subsequent condensation reaction, it is very difficult to keep alkylalkoxysilane stably in water.

For overcoming the above problem, JP-A-62-197369 discloses a method in which a hydrolyzable organosilicon compound such as alkyltrialkoxysilane is emulsified in water in the presence of a nonionic emulsifier having a hydrophilic-lipophilic balance (HLB) of 4 to 15. However, when a nonionic emulsifier alone is used, the emulsion is easily separated into two layers, and it is difficult to obtain a stable emulsion simply. This problem can be overcome by increasing the emulsifier amount. However, due to the use of the emulsifier whose amount is more than necessary, the emulsifier remains on a coated surface to decrease the effect on prevention of water absorption.

SUMMARY OF THE INVENTION

It is an object of the present invention to provide a water-based organosilicon composition which is excellent as a barrier penetrant for construction materials such as concrete and which stably maintains its performance when stored for a long period of time.

It is another object of the present invention to provide a water-based organosilicon composition in which alkylalkoxysilane and/or its condensate are/is capable of forming a stable emulsion even with a small amount of an emulsifier.

According to the present invention, there is provided a water-based organosilicon composition prepared by emulsifying alkylalkoxysilane and/or its condensate in water in the presence of (a) an anionic emulsifier and/or nonionic emulsifier, (b) a thickener, and (c) an alkaline compound.

DETAILED DESCRIPTION OF THE INVENTION

The water-based organosilicon composition of the present invention is prepared by emulsifying alkylalkoxysilane and/or its condensate in water in the presence of (a) an anionic emulsifier and/or a nonionic emulsifier, (b) a thickener, and (c) an alkaline compound.

Although not specially limited, the alkylalkoxysilane used in the present invention includes alkyltrialkoxysilanes, dialkyldialkoxysilanes and trialkylmonoalkoxysilanes. These may be used alone or in combination. The alkylalkoxysilane has at least one alkyl group having 1 to 20 carbon atoms and at least one alkoxy group having 1 to 4 carbon atoms.

The alkylalkoxysilane includes alkyltrialkoxysilanes such as methyltrimethoxysilane, methyltripropoxysilane, methyltributoxysilane, methyltriethoxysilane, ethyltrimethoxysilane, ethyltriethoxysilane, propyltrimethoxysilane, propyltriethoxysilane, butyltrimethoxysilane, butyltriethoxysilane, pentyltrimethoxysilane, pentyltriethoxysilane, hexyltrimethoxysilane, hexyltriethoxylsilane, heptyltrimethoxysilane, heptyltriethoxysilane, octyltrimethoxysilane, octyltriethoxysilane, nonyltrimethoxysilane, nonyltriethoxysilane, decyltrimethoxysilane, decyltriethoxysilane, undecyltrimethoxysilane, undecyltriethoxysilane, dodecyltrimethoxysilane, dodecyltriethoxysilane, tridecyltrimethoxysilane, tridecyltriethoxysilane, tetradecyltrimethoxysilane, tetradecyltriethoxysilane, pentadecyltrimethoxysilane, pentadecyltriethoxysilane, hexadecyltrimethoxysilane, hexadecyltriethoxysilane, heptadecyltrimethoxysilane, heptadecyltriethoxysilane, octadecyltrimethoxysilane, octadecyltriethoxysilane, nonadecyltrimethoxysilane, nonadecyltriethoxysilane, eicosyltrimethoxysilane and eicosyltriethoxysilane, dialkyldialkoxysilanes such as dimethyldimethoxysilane, octylmethyldimethoxysilane and octadecylmethyldimethoxysilane, and fluoroalkylsilanes (trade names, XC95-418, XC95-468, XC95-470 and XC95-472, supplied by Toshiba Silicone K.K.). These alkylalkoxysilanes may be used as partial condensation products or in combination.

The anionic emulsifier includes phosphate emulsifiers, sulfonate emulsifiers, sulfate emulsifiers and fatty acid emulsifiers such as sodium lauryl sulfate, lauryl sulfate triethanolamine, lauryl sulfate ammonium, sodium dodecylbenzenesulfonate, sodium alkylnaphthalenesulfonate, sodium dialkylsulfosuccinate, sodium alkyldiphenyl ether disulfonate, alkoxyalkylphosphate, alkylphosphate, alkylphosphate diethanolamine, potassium alkylphosphate, sodium polyoxyethylene laurylethersulfate, sodium polyoxyethylene alkylether sulfate, polyoxyethylene alkylethersulfate triethanolamine, sodium polyoxyethylene alkylphenylethersulfonate, sodium alkylsulfonate, mixed fatty acid sodium soap, semi-cured beef tallow fatty acid sodium soap, semi-cured beef tallow fatty acid potassium soap, sodium stearate soap, potassium oleate soap, higher alcohol sodium sulfate, sodium salt of β-naphthalene formalin condensate, special aromatic sulfonic acid formalin condensate and special carboxylic acid type surfactant.

The nonionic emulsifer includes glycerol monostearate, glycerol monooleate, sorbitan monolaurate, sorbitan monopalmitate, sorbitan monostearate, sorbitan tristearate, sorbitan monooleate, sorbitan trioleate, sorbitan monosesquioleate, polyoxyethylene sorbitan monolaurate, polyoxyethylene sorbitan monopalmitate, polyoxyethylene sorbitan monostearate, polyoxyethylene sorbitan tristearate, polyoxyethylene sorbitan monooleate, polyoxyethylene sorbitan trioleate, polyoxyethylene sorbitol tetraoleate, polyoxyethylene lauryl ether, polyoxyethylene cetyl ether, polyoxyethylene stearyl ether, polyoxyethylene oleyl ether, polyoxyethylene higher alcohol ether, polyoxyethylene octylphenyl ether and polyoxyethylene nonylphenyl ether, although the nonionic emulsifier shall not be specially limited to the above. Further, the HLB values of the above nonionic emulsifiers are not critical.

The above emulsifiers may be used alone or in combination.

Although not specially limited, the thickener includes water-soluble polymers such as sodium polyacrylate, polyvinyl alcohol, polyether, casein, mannan, starch, chitosan, carboxymethyl cellulose and methoxymethyl cellulose. In addition to the above, any thickeners which exhibit thickening properties when dissolved in water may be used.

The thickener exhibits a remarkable effect on prevention of liquid separation of the water-based organosilicon composition. The reason therefor is not yet clear. However, it is assumed that the thickener not only exhibits a thickening effect, but also serves to produce emulsification activity due to a certain correlation between the thickener and alkylalkoxysilane. Although not specially limited, the amount of the thickener is preferably 10% by weight or less on the basis of the alkylalkoxysilane and/or its condensate. When this amount exceeds 10% by weight, the viscosity of the water-based organosilicon composition may extremely increase and hinder coatability. Further, a water-soluble polymer may precipitate on a coated surface to impair the appearance of the coated surface. The lower limit of the thickener is generally 0.01% by weight on the basis of the water-based organosilicon composition, although the minimum weight percentage differs depending upon the particular thickener employed.

The alkaline compound includes metal hydroxides, ammonia and organic amines. Organic amines are particularly preferred.

Although not specially limited, tile organic amines include methylamine, ethylamine, propylamine, isopropylamine, butylamine, amylamine, hexylamine, heptylamine, octylamine, nonylamine, decylamine, laurylamine, myristylamine, cetylamine, stearylamine, oleylamine, cyclohexylamine, monoethanolamine, diethylamine, di-(n-propyl)amine, diamylamine, diethanolamine, triethylamine, triethanolamine, N,N-dimethylethanolamine, aniline, benzylamine, o-toluidine, 2-ethylaniline, 2-fluoroaniline, o-anisidine, m-toluidine, m-anisidine, m-phenetidine, p-toluidine, 2,3-dimethylaniline, 5-aminoindane, piperidine, morpholine, pyrrolidine, pyrrole, indole, indoline, imidazole, triazole, pyrimidine, imidazoline laurate, imidazoline oleate and polyoxypropyleneamine. The above organic amines may be used alone or in combination.

Due to the above alkaline compound, the water-based organosilicon composition has alkalinity. The water-based organosilicon composition obtained by emulsification in water preferably has pH of 7 to 11 in view of storage stability. When this pH is less than 7, the alkoxysilane may be hydrolyzed. When it exceeds 11, the alkoxysilane may undergo a condensation reaction. Further, the use of an organic amine such as an aliphatic amine and/or an aromatic amine as a pH adjuster can minimize a pH change when the water-based organosilicon composition is stored for a long period of time. The mechanism of this minimization is not yet clear. It is assumed that the amine is not a strong alkali but a weak alkali, and being a weak alkali has an effect on minimization of the pH change in the water-based organosilicon composition. Further, the organic amine as an alkaline compound is expected not only to have an effect on prevention of corrosion of the water-based organosilicon composition but also to prevent the occurrence of mold on a coated surface.

Further, when an anionic thickener is used, the alkaline compound has an effect on neutralization.

The water-based organosilicon composition can be obtained by preparing a mixture of the above alkylalkoxysilane and/or its condensate, (a) the anionic emulsifier and/or the nonionic emulsifier, (b) the thickener, (c) the alkaline compound and water, and stirring the mixture at a high velocity with a homomixer, or the like.

The amount of the emulsifier as a whole based on the alkylalkoxysilane and/or its condensate is preferably 0.1 to 5% by weight. When this amount is less than 0.1% by weight, it is difficult to emulsify the alkylalkoxysilane. If the alkylalkoxysilane can be emulsified, the water-based organosilicon composition is poor in storage stability, and also poor in prevention of water absorption. When it exceeds 5% by weight, the amount of the emulsifier remaining on a coated surface is too large to obtain a sufficient effect on prevention of water absorption, although the water-based organosilicon composition is improved in storage stability.

The silane component (organosilicon compound) concentration of the water-based organosilicon composition is preferably 1 to 70% by weight. When this concentration is less than 1% by weight, it is difficult to infiltrate concrete with the silane component sufficiently and obtain sufficient water absorption prevention by coating the water-based organosilicon composition on the concrete once. Further, when it is coated on the coated surface for a second time, the coated surface shows decreased infiltration performance. Therefore, an emulsion having too dilute a concentration of the silane component, i.e., less than 1% by weight of the silane component, is not suitable for the intended prevention of water absorption. When the above concentration exceeds 70% by weight, the viscosity of the water-based organosilicon composition is too high to coat it. The viscosity of the composition has almost no influence on the depth of infiltration of the silane component. However, a non-uniform coating may be formed, or the infiltration rate of the silane component decreases. Further, in the economical viewpoint, the concentration of 70% by weight of less is preferred.

When coated on construction materials such as concrete, the water-based organosilicon composition of the present invention infiltrates deeply therein to combine the hydrophilic groups of the construction materials, thereby forming an excellent hydrophobic layer to prevent the deterioration of the construction materials and impart them with durability. Further, although having an alkoxy group which easily undergoes a condensation reaction by hydrolysis, the water-based organosilicon composition of the present invention is free from an increase in viscosity, gelation and a decrease in performance for water absorption prevention even if it is stored for six months at room temperature (25° C.). Further, the water-based organosilicon composition of the present invention has a proper viscosity due to the thickener, and has adjusted alkalinity due to the organic amine, i.e., an aliphatic and/or aromatic amine. Therefore, the water-based organosilicon composition of the present invention is almost free from liquid separation and a pH change.

As described above, the water-based organosilicon composition of the present invention is very useful in the field of construction materials.

The present invention will be explained further in detail by reference to Examples.

EXAMPLE 1

30 Grams of n-hexyltriethoxysilane, 0.3 g of phosphate ester of polyoxyethylene alkyl ether (PLYSURF A212C, supplied by Daiichi Kogyo Seiyaku Co., Ltd.), 0.6 g of modified polyacrylic acid (HIVISWAKO 103, supplied by Wako Pure Chemical Industries, Ltd.), 0.3 g of propylamine and 68.8 g of water were mixed, and the mixture was stirred at a high velocity of 1,000 rpm or more to give a white aqueous emulsion. After storage at 50° C. for 2 months or more, the emulsion was still stable.

EXAMPLE 2

Example 1 was repeated except that 30 g of the n-hexyltriethoxysilane was replaced with 29.7 g of n-hexyltriethoxysilane and 0.3 g of n-hexyltrimethoxysilane to give a white aqueous emulsion. After storage at 50° C. for 2 months or more, the emulsion was still stable.

EXAMPLE 3

Example 1 was repeated except that 0.6 g of the modified polyacrylic acid was replaced with 2.4 g of polyethylene glycol (number average molecular weight about 20,000) and that the amount of water was changed from 68.8 g to 67 g to give a white aqueous emulsion. After storage at 50° C. for 2 months or more, the emulsion was still stable.

EXAMPLE 4

Example 1 was repeated except that 0.3 g of the propylamine was replaced with 0.3 g of N,N-dimethylethanolamine to give a white aqueous emulsion. After storage at 50° C. for 2 months or more, the emulsion was still stable.

EXAMPLE 5

30 Grams of n-hexyltriethoxysilane, 0.15 g of polyoxyethylene sorbitol tetraoleate (RHEODOL 430, supplied by Kao Corp.), 0.6 g of polyvinyl alcohol, 0.3 g of triethylamine and 66.1 g of water were mixed, and the mixture was stirred at a high velocity of 1,000 rpm or more to give a white aqueous emulsion. After storage at 50° C. for 2 months or more, the emulsion was still stable.

EXAMPLE 6

Example 5 was repeated except that 0.6 g of the polyvinyl alcohol was replaced with 2.4 g of polyethylene glycol (number average molecular weight 20,000) and that the amount of water was changed from 66.1 g to 64.3 g to give a white aqueous emulsion. After storage at 50° C. for 2 months or more, the emulsion was still stable.

EXAMPLE 7

Example 5 was repeated except that 0.3 g of the triethylamine was replaced with 0.3 g of pyridine to give a white aqueous emulsion. After storage at 50° C. for 2 months or more, the emulsion was still stable.

EXAMPLE 8

Example 1 was repeated except that 0.3 g of PLYSURF A212C was replaced with 0.2 g of PLYSURF A212C and 0.1 g of "RHEODOL 430" to give a white aqueous emulsion. After storage at 50° C. for 2 months or more, the emulsion was still stable.

Comparative Example 1

30 Grams of n-hexyltriethoxysilane, 0.15 g of "RHEODOL 430" and 69.85 g of water were mixed, and the mixture was stirred at a high velocity of 1,000 rpm or more to give a white aqueous emulsion. When stored at 50° C. for 1 hour, the emulsion underwent layer separation.

Comparative Example 2

30 Grams of n-hexyltriethoxysilane, 0.3 g of "PLYSURF A212C" and 69.7 g of water were mixed, and the mixture was stirred at a high velocity of 1,000 rpm or more to give a white aqueous emulsion. When stored at 50° C. for 1 hour, the emulsion underwent layer separation.

Comparative Example 3

30 Grams of n-hexyltriethoxysilane, 0.2 g of "PLYSURF A212C", 0.1 g of "RHEODOL 430" and 69.7 g of water were mixed, and the mixture was stirred at a high velocity of 1,000 rpm or more to give a white aqueous emulsion. When stored at 50° C. for 24 hours, the emulsion underwent layer separation.

[Water absorption ratio]

Each of the above water-based compositions was tested on water absorption as follows.

An emulsion was coated on a 4 cm×4 cm×8 cm substrate mortar aged four months (JIS R5201) in an air-dried state such that a build-up was 300 g/m$^2$, and resultant coating was air-dried for 28 days. Then, the substrate mortar was immersed in water for 1 day according to JIS A 1404 to determine the water absorption on the basis of the following equation.

Water absorption ratio=[amount (g) of water absorbed by a coated substrate for 1 day/amount (g) of water absorbed by an uncoated substrate for 1 day]×100.

Table 1 describes the appearance of each of the above water-based organosilicon compositions just after they were obtained, the storage stability at 25° C. and 50° C., and the water absorption ratio for 1 day, with regard to each water-based organosilicon composition.

TABLE 1

|  | Appearance just after obtained | Time before separation (storage stability at 25° C.) | Time before separation (storage stability at 50° C.) | Water absorption ratio for 1 day (%) |
| --- | --- | --- | --- | --- |
| Ex. 1 | white aqueous emulsion | more than 6 months | more than 2 months | 5.6 |
| Ex. 2 | white aqueous emulsion | more than 6 months | more than 2 months | 5.5 |
| Ex. 3 | white aqueous emulsion | more than 6 months | more than 2 months | 5.9 |

TABLE 1-continued

|  | Appearance just after obtained | Time before separation (storage stability at 25° C.) | Time before separation (storage stability at 50° C.) | Water absorption ratio for 1 day (%) |
|---|---|---|---|---|
| Ex. 4 | white aqueous emulsion | more than 6 months | more than 2 months | 5.5 |
| Ex. 5 | white aqueous emulsion | more than 6 months | more than 2 months | 5.4 |
| Ex. 6 | white aqueous emulsion | more than 6 months | more than 2 months | 5.7 |
| Ex. 7 | white aqueous emulsion | more than 6 months | more than 2 months | 5.5 |
| Ex. 8 | white aqueous emulsion | more than 6 months | more than 2 months | 5.5 |
| CEx. 1 | white aqueous emulsion | less than 1 day | less than 1 hour | 5.2 |
| CEx. 2 | white aqueous emulsion | less than 1 day | less than 1 hour | 5.3 |
| CEx. 3 | white aqueous emulsion | less than 1 day | less than 1 day | 5.3 |

Ex. = Example, CEx. = Comparative Example

What is claimed is:

1. A barrier penetrant for construction materials, which comprises a water-based organosilicon composition prepared by emulsifying alkylalkoxysilane and/or its condensate in water in the presence of (a) a phosphate anionic emulsifier, (b) at least one water-soluble polymer thickener selected from the group consisting of sodium polyacrylate, polyvinyl alcohol, polyether, casein, mannan, starch, chitosan, carboxymethyl cellulose and methoxymethyl cellulose, and (c) an organic amine alkaline compound, said alkaline compound being present in an amount sufficient to maintain the composition at a pH of 7 to 11.

2. A barrier penetrant according to claim 1, wherein the water-soluble polymer thickener is at least one compound selected from the group consisting of sodium polyacrylate, polyethylene glycol, polyvinyl alcohol and casein.

3. A barrier penetrant according to claim 1, wherein the amount of the anionic emulsifier is 0.1 to 5% by weight based on the alkylalkoxysilane and/or its condensate.

4. A barrier penetrant according to claim 1, wherein the amount of the thickener is 10% by weight or less based on the alkylalkoxysilane and/or its condensate.

5. A barrier penetrant according to claim 1, wherein the amount of the alkylalkoxysilane and/or its condensate is 1 to 70% by weight.

6. A water-resistant construction material comprising:

a construction material, and a water-based organosilicon composition prepared by emulsifying in water (a) at least one member selected from the group consisting of alkylalkoxysilane and a condensate of alkylalkoxysilane, (b) a phosphate anionic emulsifier, (c) at least one water-soluble polymer thickener selected from the group consisting of sodium polyacrylate, polyvinyl alcohol, polyether, casein, mannan, starch, chitosan, carboxymethyl cellulose and methoxymethyl cellulose, and (d) an organic amine alkaline compound; said alkaline compound being present in an amount sufficient to maintain the pH of the composition at a value of 7 to 11, and wherein said construction material is coated and infiltrated with said water-based organosilicon composition.

7. A water-resistant construction material according to claim 6, wherein the water-soluble polymer thickener is at least one compound selected from the group consisting of sodium polyacrylate, polyethylene glycol, polyvinyl alcohol and casein.

8. A water-resistant construction material according to claim 6, wherein said construction material is selected from the group consisting of concrete and mortar.

9. A method of waterproofing a construction material comprising:

preparing a water-based organosilicon composition by emulsifying in water (a) at least one member selected from the group consisting of alkylalkoxysilane and a condensate of alkylalkoxysilane, (b) a phosphate anionic emulsifier, (c) at least one water-soluble polymer thickener selected from the group consisting of sodium polyacrylate, polyvinyl alcohol, polyether, casein, mannan, starch, chitosan, carboxymethyl cellulose and methoxymethyl cellulose, and (d) an organic amine alkaline compound said alkaline compound being present in an amount sufficient to maintain the composition at a pH of 7 to 11;

coating and infiltrating a construction material with said composition; and drying said coated and infiltrated construction material.

10. A method of waterproofing a construction material according to claim 9, wherein the water-soluble polymer thickener is at least one compound selected from the group consisting of sodium polyacrylate, polyethylene glycol, polyvinyl alcohol and casein.

11. A method of waterproofing a construction material according to claim 9, wherein said construction material is selected from the group consisting of concrete and mortar.

* * * * *